June 13, 1967  C. D. ROSE  3,325,208
AUTOMOBILE SAFETY VISOR
Filed Feb. 24, 1965
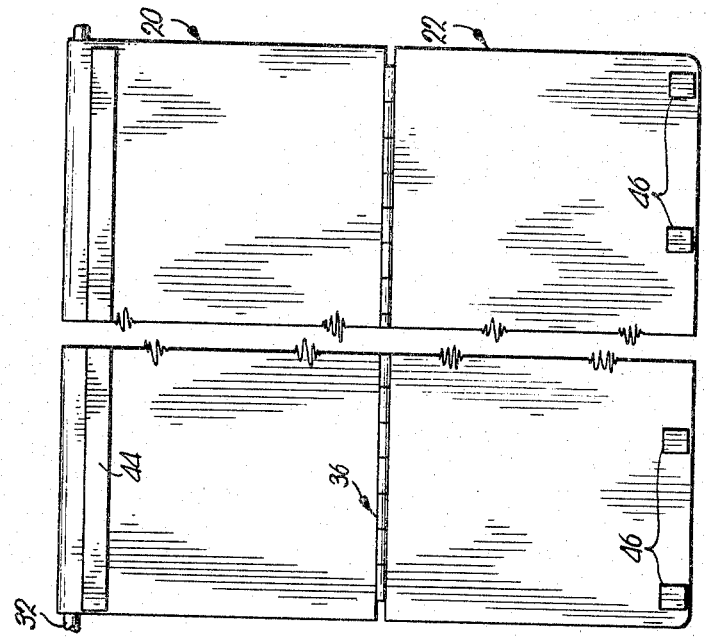
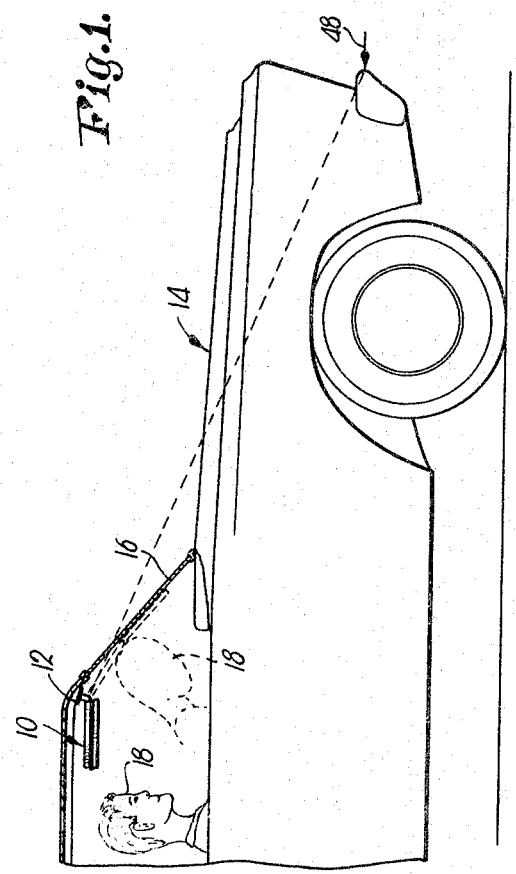
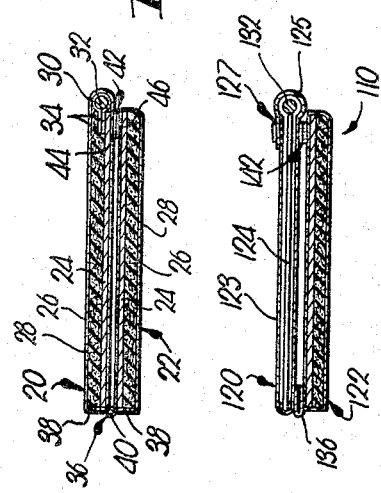
INVENTOR.
Calvin D. Rose
BY
Hovey, Schmidt, Johnson & Hovey
ATTORNEYS.

United States Patent Office 3,325,208
Patented June 13, 1967

3,325,208
AUTOMOBILE SAFETY VISOR
Calvin D. Rose, 6230 May Lane,
Kansas City, Kans. 66104
Filed Feb. 24, 1965, Ser. No. 434,881
2 Claims. (Cl. 296—84)

This invention relates to safety devices for vehicles and, more particularly, to a safety visor for the windshield of an automobile or the like.

Injuries suffered by occupants of an automobile due to striking the windshield upon impact of the automobile with an obstruction, such as occurs during a head-on collision, may be minimized by the use of a barrier movable between the occupants and the windshield. This has been proposed in the past, but the prior art devices, for the most part, are unsatisfactory because they are too bulky, difficult to operate, and cannot be moved into operative positions quickly enough to be of any value. Moreover, some of these devices are not automatically actuated in response to a collision. They must be manually actuated after an occupant of the automobile has been forewarned of an emergency prior to an actual collision. Since individuals react differently to emergency situations, such devices are not effective at all times. Other prior art devices, although actuated in response to an impact, are impractical for use in protecting against injury because of their size and the way in which they are actually put into use.

The present invention is directed to improvements in safety devices of the type described and provides a safety visor of improved construction which is normally retained in a retracted position but which automatically moves into an operative position across the windshield of a vehicle when the latter is subjected to a rapidly applied decelerating force, such as an impact with a stationary barrier or with another vehicle during a head-on collision. The safety visor is thus responsive to an impact and effectively covers the windshield in advance of the forward movement of an occupant of the vehicle so as to protect such occupant from injury due to broken glass or actually striking the windshield.

It is, therefore, the primary object of this invention to provide an improved safety visor for the windshield of a vehicle which automatically moves across the windshield to protect an occupant therein so that the occupant need not be forewarned of an impending collision and bodily injury to the occupant will be substantially minimized inasmuch as the occupant will move against the safety visor rather than be hurled against the windshield as a result of the collision.

Another object of the instant invention is the provision of a safety visor of the type described which can be secured in the position normally occupied by a conventional visor of an automobile so that the safety visor may be used without modifying the structure of the automobile.

Still another object of the present invention is the provision of a safety visor of the aforesaid character which is sectionalized so that it can be conveniently retracted and stored in a minimum of space and can be quickly placed in operation as it expands to a size sufficient to cover the major portion of the windshield so as to protect against broken glass, as well as to prevent an occupant from striking the windshield.

Yet another object of this invention is the provision of a safety visor of the above-mentioned type wherein a pair of sections forming a major part of the safety visor are hingedly connected and are releasably retained in side-by-side relationship by magnetic structure, whereby the sections may be readily separated to effect the expansion of the safety visor in response to a rapidly applied decelerating force exerted on the vehicle with which the safety visor is utilized.

In the drawing:

FIGURE 1 is a fragmentary, side elevational view of a vehicle illustrating the way in which the safety visor of this invention is mounted thereon rearwardly of the windshield thereof;

FIG. 2 is a cross-sectional view of one embodiment of the safety visor, showing the same in a retracted position;

FIG. 3 is a side elevational view of the safety visor in an extended, operative position; and FIG. 4 is a view similar to FIG. 2 but illustrating a second embodiment of the safety visor.

Safety visor 10 is adapted to be mounted on the portion 12 of a vehicle 14 adjacent the upper extremity of the windshield 16 thereof. Visor 10 is adapted to be moved into the dashed line location of FIG. 1 upon impact of vehicle 14 with a barrier, such as occurs during a head-on collision with a vehicle traveling in the opposite direction. In this way, visor 10 provides a means for protecting the head 18 of an occupant of vehicle 14 from flying glass, as well as to prevent head 18 from striking the inner surface of windshield 16

As shown in FIG. 1, visor 10 is in a retracted position permitting full view of the road ahead of vehicle 14. Visor 10 is also in the disposition normally occupied by the sun visor of vehicle 14 so that it may double as a sun visor when not required for use in protecting head 18 during impacts.

One embodiment of visor 10 is illustrated in FIGS. 2 and 3 and includes a pair of sections 20 and 22. Each of the sections includes a generally rigid back 24, a layer 26 of cushioning material, and a cover 28, such as fabric or the like, to surround back 24 and layer 26 so as to provide a neat and finished appearance for the corresponding section.

Section 20 is provided with a split ring 30 normally disposed about a support shaft 32 secured in any suitable manner to portion 12, the latter forming a support for shaft 32. Ring 30 has a pair of projections 34 which may be interconnected by screw means (not shown) so that the frictional force between ring 30 and shaft 32 may be varied as desired. Hence, section 20 is swingably mounted adjacent one longitudinal edge thereof on shaft 32 for movement downwardly into the dashed-line position shown in FIG. 1.

The opposite longitudinal edge of section 20 is secured to a proximal longitudinal edge of section 22 by a hinge 36 comprised of a pair of members 38 secured to the end faces of respective sections 20 and 22 and pivotally interconnected by a pin 40. Hinge 36 permits rotation of section 22 relative to section 20 through an arc of substantially 180° inasmuch as member 38 of section 22 engages member 38 of section 20 after section 22 has swung through such an arc relative to section 20. Section 22 is normally disposed in side-by-side relationship with respect to section 20 in the manner shown in FIG. 2 when visor 10 is in the retracted position shown in FIG. 1. Hence, the plane of section 22 is substantially parallel to the plane of section 20. Since sections 20 and 22 are approximately of the same width, the opposite longitudinal edge of section 22 is adjacent to shaft 32 when visor 10 is retracted.

Hinge 36 permits free swinging movement of section 22 relative to section 20. The frictional force between ring 30 and shaft 32 is sufficient to normally retain section 20 in the horizontal disposition thereof shown in FIG. 1. Hence, structure 42 is required to maintain section 22 in side-by-side relationship to section 20 until visor 10 is required to be moved across windshield 16.

Structure 42 includes a metal strip 44 on one flat face of section 20 and a number of permanent magnets 46 on the adjacent flat face of section 22 as shown in FIG. 2. Magnets 46 attract strip 44 to releasably retain sections 20 and 22 in their retracted positions shown in FIG. 2. The strength of magnets 46 is selected to assure separation of sections 20 and 22 when vehicle 14 is subjected to a decelerating force resulting from impact of the front of the vehicle on another object. When impact occurs, the force of the impact is transferred through the frame and body of the vehicle to the mounting means for shift 32. The impactive force is thus transferred to shaft 32, driving the front edge of section 20 away from the adjacent longitudinal edge of section 22. This breaks the securing connection of structure 42. The inertial forces of the respective sections 20 and 22 then swing section 20 in a counterclockwise direction about shaft 32 when viewing FIG. 2. Simultaneously, section 22 will swing in a clockwise direction with respect to section 20. Section 22 will thus become aligned with section 20 in the manner shown in dashed lines of FIG. 1 so that sections 20 and 22 will form a panel blocking the path of travel of head 18 toward windshield 16.

In use, visor 10 is mounted on shaft 32 and the frictional force between ring 30 and shaft 32 is adjusted to a value corresponding to an impact force denoted by the arrow 48 exerted on vehicle 14 in a direction opposite to its normal path of travel. This will allow section 20 to swing downwardly to its operative position across windshield 16. As mentioned above, the strength of magnets 46 is such as to assure separation upon impact and the swinging of secton 22 relative to section 20 upon downward swinging movement of section 20 under the influence of an impact force exerted in the direction of arrow 48.

When vehicle 14 rapidly decelerates, such as by striking a wall or colliding with a vehicle traveling in the opposite direction, the momentum of section 20 swings the latter downwardly about shaft 32. Simultaneously, section 22 separates from section 20 and is thus freely swingable through the limited arc defined by hinge 36. Visor 10 thus automatically moves into the dashed-line position of FIG. 1 in advance of head 18 so that an occupant of vehicle 14 will not suffer injuries due to flying glass from windshield 16 or from striking the inner surface of windshield 16. In the operative position of visor 10, layers 26 are on the side opposite to the side facing windshield 16 so that the movement of head 18 is cushioned to thereby assist in dissipating the kinetic energy thereof. Visor 10 may be manually retracted by the occupant after an impact so as to permit further viewing through windshield 16.

A pair of visors 10 may be utilized for covering substantially the entire inner surface of windshield 16. In this respect, a pair of visors 10 may replace the pair of sun visors conventionally provided for occupants in the front seat of vehicle 14. Visor 10 not only protects occupants of vehicle 14 from injuries, but also protects windshield 16 from breaking and shattering inasmuch as the impact force exerted on visor 10 by head 18 is distributed over a relatively wide area of the inner surface of windshield 16 rather than being concentrated at a particular location thereon.

A second embodiment of the visor, denoted by the numeral 110, includes a pair of sections 120 and 122, section 122 being substantially identical in all respects with section 22 of visor 10. Section 120 includes a tubular element 123, and a generally rigid base 124 within element 123, base 124 comprising a conventional sun visor normally found in automobiles or the like. Element 123 is in the nature of a sock or other unit made from fabric or the like which has substantially the same dimensions as back 24 so that the latter is received within element 123 as the latter is placed thereover. A flap 125 on element 123 passes about the support shaft 132 and releasably maintains element 123 on base 124 by snap fastener 127.

A flexible hinge 136, such as a leather strip or the like, interconnects proximal longitudinal edges of section 122 and element 123 to permit swinging movement of section 122 through an arc of approximately 180° relative to section 120. Structure 142 similar in all respects to structure 42 of visor 10, is provided to maintain section 122 in side-by-side relationship to section 120 in the manner shown in FIG. 4 when visor 110 is retracted.

In use, element 123 is placed over base 124 and retained thereon by snap fastener means 127. Structure 142 normally retains section 122 alongside section 120 so that visor 110 may be stored in a retracted position similar to the position shown in FIG. 1 with respect to visor 10.

Upon impact of the vehicle with which visor 110 is associated, the front edge of section 120 will be driven away from the adjacent edge of section 122. Simultaneously, sections 120 and 122 will separate and section 122 will swing with respect to section 120 until the sections define a panel having sections 120 and 122 substantially coextensive with each other. Visor 110 will thus move across the windshield of a vehicle before an occupant strikes the windshield; hence, visor 110 protects the occupant from injury as well as prevents the breakage of the windshield by virtue of being struck by the occupant.

The visor of the present invention provides a unique safety device for all vehicles having windshields. The visor may be readily coupled to existing sun visor mounting means so that no modification to a vehicle is required in order to utilize the present visor. In addition, the visor automatically moves into position and the driver or other occupants of the vehicle need not be forewarned of approaching danger due to impact.

Having thus described the invention, what is claimed as new and desired to be secured by Letters Patent is:

1. A safety visor for the windshield of a vehicle comprising:
   a support adapted to be positioned on the vehicle adjacent the upper extremity of the windshield thereof;
   a substantially horizontal shaft carried by said support and extending substantially transversely of the path of travel of the vehicle;
   a first padded safety visor section having a pair of parallel, longitudinally extending edges;
   means swingably mounting one of the edges of said first section on said shaft, said first section being swingable downwardly about said shaft from a stand-by position extending substantially horizontally rearwardly from said shaft to a position with the other of said edges adjacent said windshield;
   a second padded safety visor section of substantially the same width as said first section, said second section having a pair of parallel, longitudinally extending edges;
   hinge means disposed parallel to said shaft and swingably interconnecting the rearmost edge of said first section with an aligned edge of said second section to permit swinging of the latter about said rearmost edge into a stand-by position underlying said first section in generally parallel relationship therewith when the first section is in said stand-by position, and to permit swinging of the second section downwardly and in the opposite direction from said first section as the latter swings downwardly about said shaft; and permanent magnet means disposed adjacent said one edge of first section and the corresponding adjacent edge of the second section for releasably holding said sections in the stand-by positions thereof with the second section folded upon and underlying the first section, said magnet means having a strength to permit impactive separation of said sections by a force transmitted to said visor through the support whereupon the inertia of the visor causes swinging movement of said first and second sections in opposite directions about said mounting means and hinge means respectively to unfold said visor in protective disposition across said windshield.

2. A safety visor as set forth in claim 1, wherein said first section includes a base and a tubular element releasably coupled to the base, said hinge means including a flexible strip interconnecting the element and the other section.

References Cited

UNITED STATES PATENTS

| | | | |
|---|---|---|---|
| 2,257,612 | 9/1941 | Lininger | 296—97 X |
| 2,603,530 | 7/1952 | Jones | 296—97 |
| 2,842,395 | 7/1958 | Davis | 296—97 |
| 2,933,343 | 4/1960 | Potts | 296—84 |

FOREIGN PATENTS

| | | |
|---|---|---|
| 820,386 | 11/1951 | Germany. |
| 870,071 | 3/1953 | Germany. |

BENJAMIN HERSH, *Primary Examiner.*

J. A. PEKAR, *Assistant Examiner.*